United States Patent [19]

Antel

[11] Patent Number: 5,004,161

[45] Date of Patent: Apr. 2, 1991

[54] ADJUSTABLE MINIATURE WATERING DEVICE

[75] Inventor: William E. Antel, Murray Bridge, Australia

[73] Assignee: Antelco Pty. Ltd., Australia

[21] Appl. No.: 425,795

[22] Filed: Oct. 23, 1989

[30] Foreign Application Priority Data

Oct. 24, 1988 [AU] Australia .................... PH1124

[51] Int. Cl.$^5$ .............................................. B05B 15/00
[52] U.S. Cl. ..................................... 239/542; 239/547
[58] Field of Search ............... 251/117, 205, 209, 211; 239/542, 547; 137/513.5

[56] References Cited

U.S. PATENT DOCUMENTS

| | | | |
|---|---|---|---|
| 2,720,845 | 10/1955 | Whitlock | 251/117 X |
| 2,811,392 | 10/1957 | Warp | 239/547 X |
| 3,794,249 | 2/1974 | Lockwood | 239/582.1 X |
| 4,084,749 | 4/1978 | Drori | 239/542 X |
| 4,095,745 | 6/1978 | Christy et al. | 239/542 X |
| 4,732,329 | 3/1988 | Martin | 239/542 |
| 4,752,031 | 6/1988 | Merrick | 239/542 X |

FOREIGN PATENT DOCUMENTS 496715  8/1954  Italy ...................................... 251/205

Primary Examiner—Kashnikow: Andres
Assistant Examiner—Kevin Weldon
Attorney, Agent, or Firm—Brown, Martin, Haller & McClain

[57] ABSTRACT

An improved miniature watering unit is disclosed, which has a cylindrical body attached to a source of pressurized water, having one or more water discharge openings and a rotatable cap. As the cap is rotated, a stem is raised or lowered to form an arcuate orifice of variable circumferential width between the stem and the interior of the body. The adjustment in width of the orifice in turn adjusts the rate of water from the discharge openings.

6 Claims, 3 Drawing Sheets

ADJUSTABLE MINIATURE WATERING DEVICE

The present invention relates to miniature watering units and more particularly to an improved trickle feed/dripper unit having an adjustable cap for adjusting the water flow rate and in turn the amount of water delivered by the unit. The invention is especially applicable for domestic garden irrigation systems.

Miniature watering devices, whether in the form of dripper or spray units are extensively used for the application of water to gardens and garden plants. Many forms of miniature watering devices are available which provide various degrees of coverage of particular areas as well as an adjustable rate of water flow. However, the applicant is aware of a number of problems associated with such prior art miniature watering units. One significant problem has been their tendency to block or clog due to the accumulation of grit o other foreign particles within the waterflow passageways and their inability to be cleaned easily in service. A further problem is the inability to accurately adjust the rate of flow of water emitted by the individual units. Some prior art units, although claiming to have an adjustable flow rate feature, normally do not achieve such adjustably in service - one of the reasons for that being the tendency of the units to become partially blocked or clogged.

It is the main object of the present invention to provide an improved miniature watering unit which provides an adjustable water flow rate.

It is a further object of the present invention to provide an improved miniature watering unit which allows the water flow rate to be accurately and readily adjusted.

It is a still further object of the present invention to provide an improved miniature watering unit which is of extremely simple design, inexpensive to manufacture and which desirably consists of only two component parts, and which is easily cleaned should it become 'blocked' or 'clogged' with foreign matter.

According to one aspect of this invention therefore, an improved miniature watering unit comprises a generally cylindrical base having walls forming a central axial bore extending through the base and preferably an annular chamber surrounding said bore-forming walls and coaxial therewith, said axial bore comprising a lower small diameter bore portion which connects to or merges into an upper relatively large diameter bore portion, inlet means communicating with one end of said bore for attachment to a source of pressurised water, the other end of said bore communicating with a water outlet opening, and a rotatable cap threadably mounted on said base and having a centrally located stem depending from its top wall, arranged to insertingly engage coaxially within said bore, and being provided with a sealing engagement surface intermediate its ends arranged, when the unit is in its inoperative condition, to sealingly engage the wall of the small diameter bore portion at or adjacent its upper end, said stem having a reduced thickness section extending between the lower end of the stem and said engagement surface, the reduced thickness section being shaped and dimensioned such that, as the cap is rotated relative to the base to in turn raise or lower the stem, an arcuate orifice of variable circumferential width is formed between the stem and the upper circular edge (or surface) of the small diameter bore portion, the adjustment in width of the orifice in turn adjusting the rate of water flow from the unit.

Preferably, the arrangement is such that gradual unscrewing of the cap produces a progressive increase in the water flow rate, whilst gradual tightening of the cap causes the flow rate to progressively decreased until such time as the engagement surface on the stem sealingly engages with the wall of the small diameter bore.

Preferably the rotatable cap is provided with a generally cylindrical outer peripheral skirt and an inner peripheral skirt spaced radially therefrom, each said skirt depending from the top wall of the cap, said inner skirt dividing the chamber axially, whereby water exiting from the open upper end of the bore follows an elongated flow path prior to its discharge through outlet orifices formed around the upper periphery of the cap.

In another preferred arrangement, the axial stem is provided with a narrow axially extending groove in its outer surface on that side opposite to that on which the cut-away section is formed, there being co-operable sealing engagement surfaces between the lower end of the stem and the lower end of the small diameter bore portion for shutting off the flow of water into the small diameter bore portion when the cap is fully closed. The length of the axial groove is selected so that as the cap is initially unscrewed, water can flow only along the groove, into the large diameter bore portion, and discharge from the upper end of the axial bore, the water being emitted from the unit in a drip form. Upon further unscrewing of the cap, a larger flow of water is caused to flow through the adjustable width arcuate orifice, the rate of water flow progressively increasing as the cap is unscrewed progressively further.

In another preferred embodiment, the unit is provided with ratchet means co-operable between the cap and the body arranged to provide a step-by-step rotational adjustment of the cap with respect to the body. With this arrangement one is able to accurately set the flow rate by counting the number of "clicks" which occur as the cap is unscrewed from its fully closed position.

In another preferred embodiment, the inlet means comprises a hollow spigot member depending centrally from a circular base flange on the body and adapted to be inserted and sealingly engaged in an aperture in the wall of a hose, said hollow spigot member having an inlet passageway which is coaxial with the axial bore in the body but of smaller diameter.

Preferably the cap and body are formed of any suitable plastics material by an injection moulding process.

In order to more fully explain the present invention, an embodiment is described hereunder with reference to and as illustrated in the accompanying drawings in which.

Figure 1:
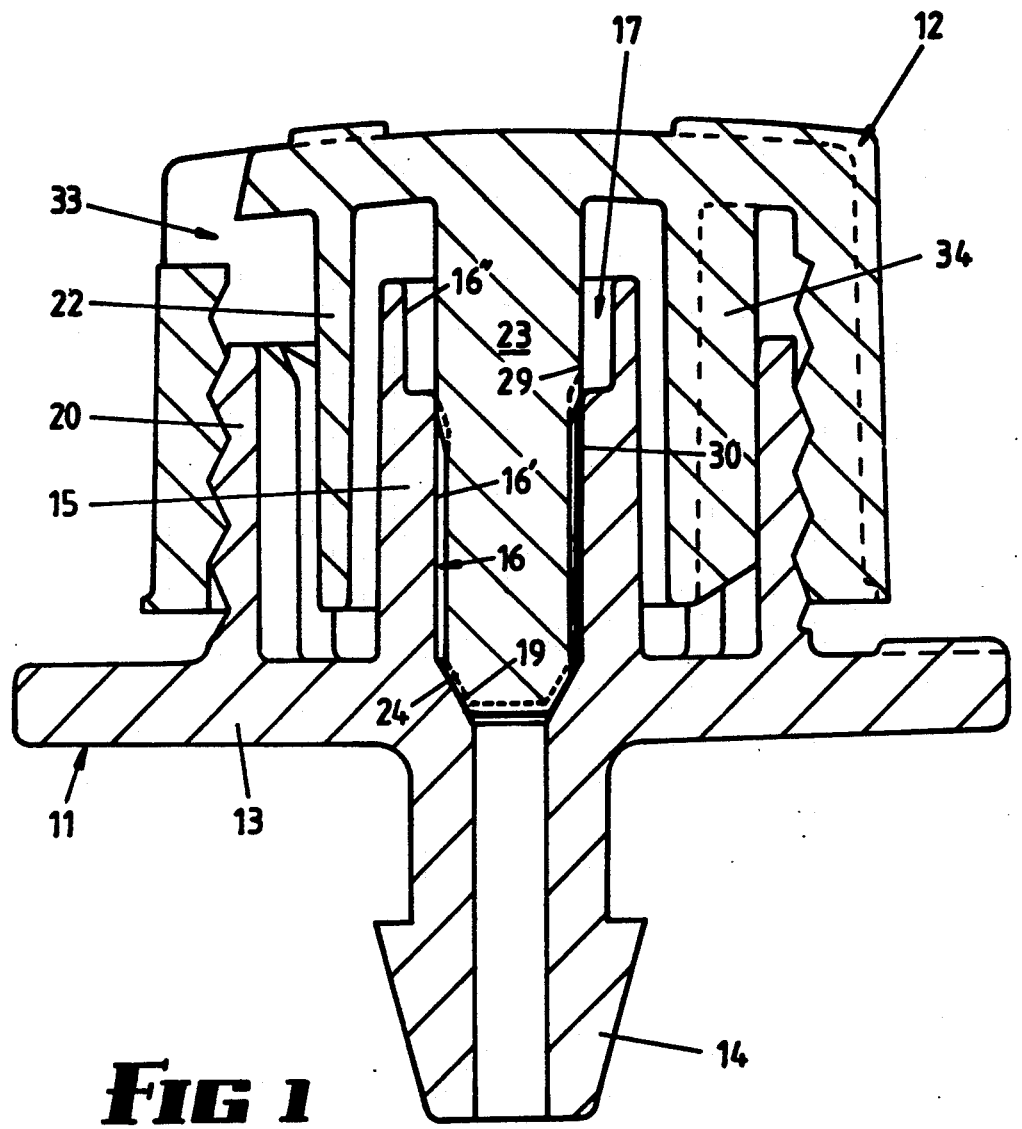
FIG. 1 is an enlarged sectional view taken through the miniature watering unit of this invention showing the cap engaged on the main body.
Figure 2:
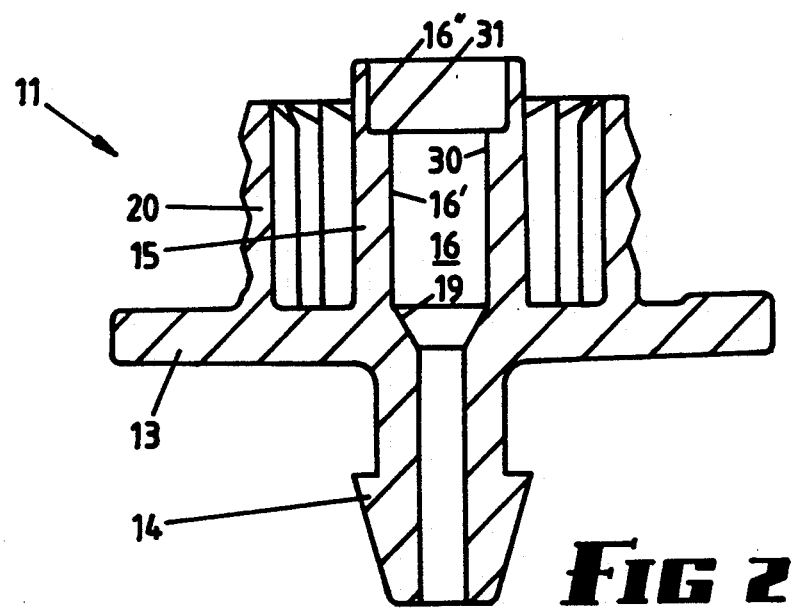
FIG. 2 is an enlarged vertical sectional view taken through the base of the unit.
Figure 3:
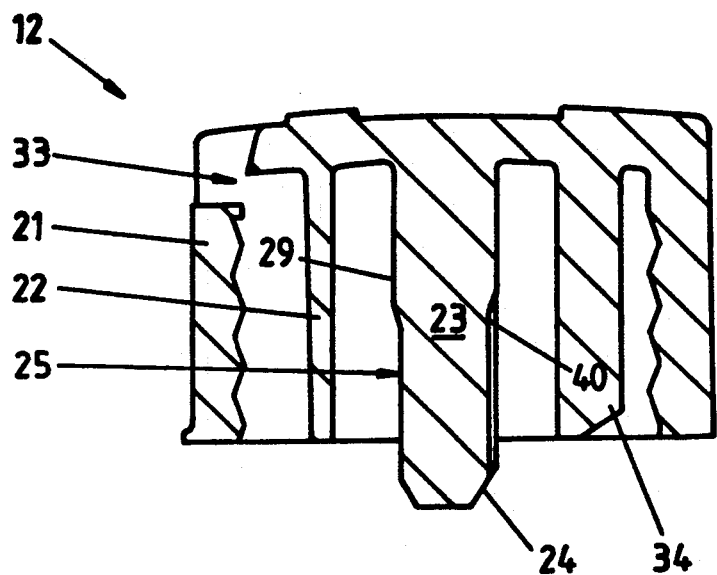
FIG. 3 is an enlarged vertical sectional view taken through the cap of the unit.
Figure 4:
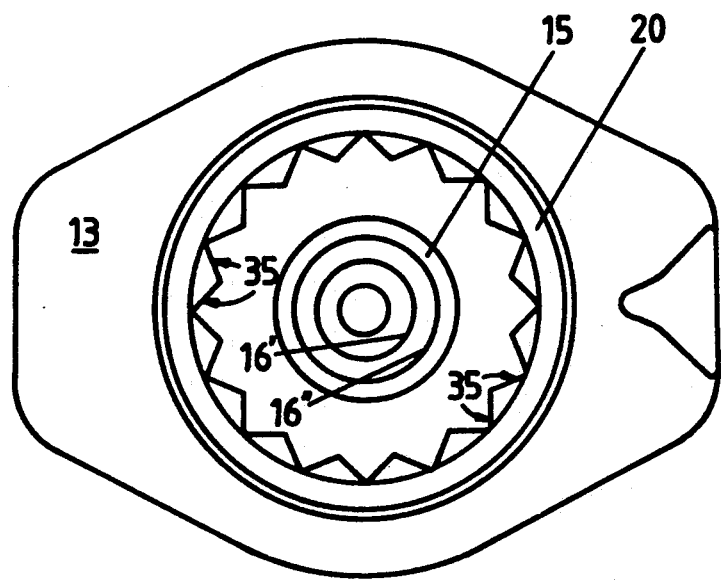
FIG. 4 is a plan view of the base shown in FIG. 2, whilst
Figure 5A:
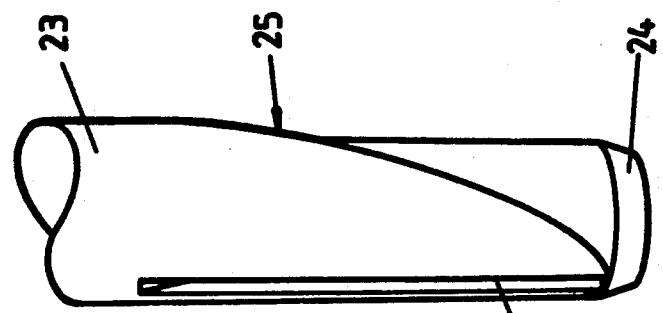
Figure 5B:
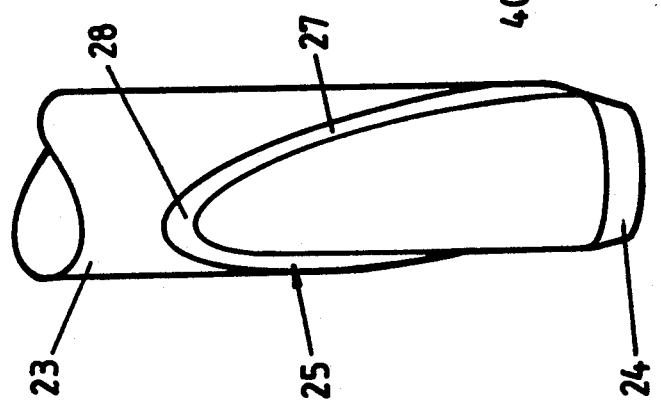
Figure 5C:
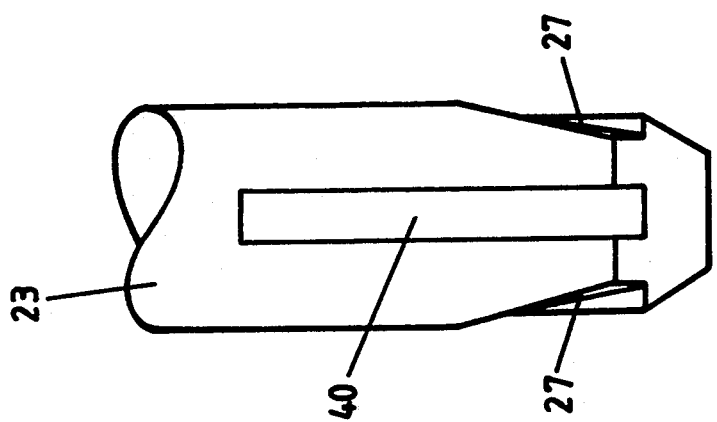
Figure 5D:
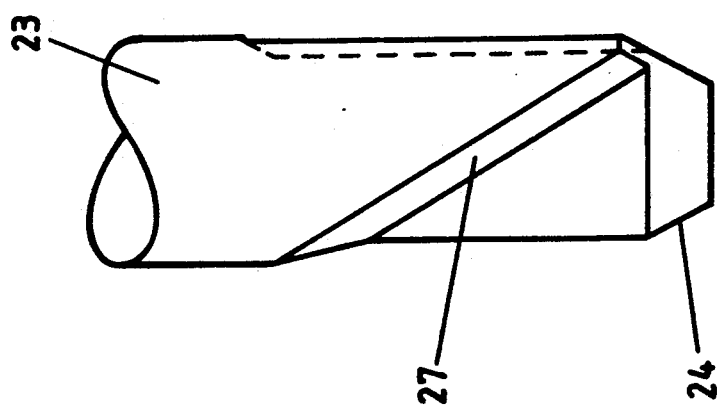

FIGS. 5 (a) to (d) show fragmentary elevational and perspective views of the stem depending from the top wall of the cap.

In this embodiment, a miniature watering device 10 comprises an integrally moulded body 11 which rotatably supports an integrally moulded cap 12. The body 11 comprises a circular base flange 13 from which centrally depends an inlet spigot 14 which is adapted to be inserted and sealingly engaged in an aperture in the wall of a hose (not shown). The body 11 is further formed with a central sleeve or tubular member 15 which extends upwardly from the base and has a stepped cylindrical through bore 16 extending axially therethrough, the axial bore 16 communicating with an inlet passageway extending through the inlet spigot 14. The bore 6 comprises a small diameter bore portion 16' which merges into a large diameter bore portion 16", the large diameter bore portion 16" terminating in an opening 17.

A frustoconical valve seating surface 19 is formed between the inlet passageway and the small diameter bore portion 16', with the diameter of the inlet passageway being less than the diameter of the bore portion 16'.

The body 11 is further provided with an outer tubular wall 20 coaxial with and surrounding the inner sleeve 15 so as to define an annular chamber therebetween, the outer surface of the wall 20 being threaded for threadably receiving the cap 12.

The cap 12 is provided with a depending outer peripheral skirt 21, a depending inner annular skirt 22 and a depending central stem or spigot member 23 which, when the cap 12 is fitted to the body 11, extends into the stepped cylindrical through bore 16. The lower end of the stem 23 is formed with a frustoconical portion 24 which, when the cap is in its fully tightened position, seats against the seating surface 19 so as to shut-off the flow of water into the small diameter bore portion 16'.

The depending stem or spigot 23 is, in this embodiment, of solid generally cylindrical configuration and is provided with a cut-away section 25 (refer FIG. 5) which extends from approximately medially of its length to the upper edge of the frustoconical portion 24 at the lower end of the stem. The cut-away section 25 is configured so that the cross-sectional area of the stem 23 progressively decreases in a downwards direction along the stem.

The cutaway section is bounded by part-spiral surfaces 27 of opposite hand, which extend upwardly from the lower end of the stem. In this embodiment the surfaces 27 merge together through a curved bridging surface 28 at the upper end of the cut-away section.

The stem 23 is also formed with an engagement surface 29 which is arranged to seal (by means of an interference fit) with surface 30 at the upper end of the small diameter bore portion 16'. With the cap 12 in its fully engaged or closed position on the body 11, the cylindrical surface 29 on the stem 23 sealingly engages against the seating surface 30 so as to prevent flow of water upwardly through the bore portion 16' into the large diameter bore portion 16". In this position, the valve seat engaging surface 24 also sealingly engages the seating surface 19 so as to provide a further seal (the purpose of which will be explained hereinafter).

Upon unscrewing of the cap 12, the stem is displaced axially upwards relative to the bore 16 and a water flow path is established once the engagement surface 29 moves clear of the surface 30 and the upper end of the cut-away section 25 of the stem 23 moves past the upper circular edge 31 of the bore portion 16' and projects into the large diameter bore portion 16". As the cap is unscrewed further, the size of the arcuate orifice formed between the stem 23 and the edge 31 progressively increases to in turn progressively increase the rate of water flow.

Water flowing upwardly through the bore 16, passes through open end 17 and follows an extended or elongated flow path (refer FIG. 1) before discharging openings 33 spaced circumferentially around the upper peripheral edge of the cap 12. In this embodiment there are eight discharge openings 33 but of course the number may be readily varied.

In order to obtain an accurate setting of the flow rate for each of the units, there is provided a ratchet means which permits a step-by-step rotational adjustment of the cap 12 with respect to the body 11. In this embodiment the ratchet means comprises an axially extending flexible rib or fin 34 which projects radially outwardly from the inner peripheral skirt 22 and which resiliently engages within axially extending grooves 35 of 'V' shaped configuration formed around the inner cylindrical surface of the outer tubular wall 20 of the body 11. Consequently as the cap is unscrewed, one is able to count the number of audible "clicks" and thereby accurately set each of the units so as to deliver approximately the same volume of water to plants. It also allows one to adjust the setting of individual units to deliver greater or lesser volumes of water to plants depending on their requirements.

The above described construction provides a device which can be constructed such that its components may be made by an injection moulding process and easily assembled as shown in FIG. 1 so as to provide an assembled miniature watering unit which can be then readily attached to a water distribution hose.

In operation, the cap and body components of the unit fit together in the manner as shown in FIG. 1 with the cap 12 threadably engaging the outer threaded tubular wall of the body 11 and the central stem 23 depending coaxially into the through bore 16 of the inner tubular sleeve 15 of the body. The rate of flow is adjusted by either unscrewing or tightening the cap 12 and causes the stem to move either axially inwardly or axially outwardly with respect to the bore 16 and in turn is effective to adjust the width of the arcuate outlet orifice formed between the outer curved surface of the cut-away section of the stem and the circular edge (or edge surface) at the upper end of the small diameter bore portion 16'. The circular edge surface may be formed as an actual seating surface.

In this embodiment, the stem is also provided with an axially extending groove 40 which faces away from the out-away section 25, the length of the groove 40 being slightly greater than the axial length of the cut-away section 25. With this arrangement, upon initially unscrewing the cap 12, water is permitted only to flow upwardly along the groove 40 and then metered into the large diameter bore portion 16" of the through-bore 16, the water subsequently flowing along the elongated or extended water flow path within the annular chamber of the unit and exiting through the discharge openings 33. This allows the unit to function as a "dripper" unit where only very small water flow rates are required. This is shown in dotted lines in FIG. 1.

It will of course by appreciated that the cap may be designed as a spray nozzle to produce a miniature sprayer having an adjustable spray discharge. In this instance, the axial groove 40 is dispensed with.

A brief consideration of the above described embodiment will indicate that the invention provides a vastly improved miniature watering device which is of extremely simple design construction, is able to have its flow rate readily and accurately adjusted so as to either increase or decrease same, and which is able to be easily cleaned when in service.

I claim:

1. An improved miniature watering unit comprising:
a generally cylindrical body having first walls forming a central axial bore extending therethrough and second walls defining an annular chamber surrounding said first walls and coaxially therewith, said bore having a lower small diameter bore portion and an upper large diameter bore portion;
inlet means communicating with said small diameter bore portion for attachment to a source of pressurized water;
at least one water outlet opening communicating with said large diameter bore portion;
a rotatable cap threadably mounted on said body and having
a centrally located stem depending from the top wall of said cap disposed to insertingly engage coaxially with said bore and
a generally cylindrical outer peripheral skirt and an inner peripheral skirt spaced radially from said outer skirt, each said skirt depending from the top wall of said cap,
said stem having an upper sealing engagement surface intermediate to its ends disposed to engage in sealing relationship with the upper end of said small diameter bore portion, and a reduced thickness section extending between said engagement surface and the lower end of said stem, being shaped and dimensioned such that an arcuate orifice of variable circumferential width is formed between said stem and the upper edge of said small diameter bore portion as said cap is rotated relative to said body to raise or lower said stem within said bore, whereby the adjustment in width of said orifice in turn adjusts the rate of water flow from said unit, and
said inner skirt projecting into said annular chamber and dividing it axially such that water exiting from the open upper end of said bore follows an elongated flow path prior to its discharge through outlet orifices formed around the upper periphery of said cap; and
ratchet means co-operable between said cap and said body arranged to provide a step-by-step rotational adjustment of said cap with respect to said body.

2. An improved miniature watering unit according to claim 1 wherein said reduced thickness section is bounded by part spiral edge surfaces of opposite hand which merge with one another at the upper end of the reduced thickness section.

3. An improved miniature watering unit according to claim 1 wherein said stem is provided with a narrow axially extending channel forming groove in its outer surface, the axial length of said groove being slightly greater than the axial length of said reduced thickness section, the lower end of said stem being further provided with an annular valve seat engaging surface which, when the unit is inoperative, sealingly engages against a correspondingly shaped lower valve seating surface formed at the lower end of said small diameter bore portion, the arrangement being such that as the cap is initially unscrewed, water can flow only along said groove into the large diameter bore portion, whilst upon further unscrewing of the cap, a larger flow of water is caused to flow by virtue of said adjustable width arcuate orifice, the rate of water flow progressively increasing as the cap is unscrewed progressively further.

4. An improved miniature watering unit according to claim 1 wherein said ratchet means comprises axially extending grooves of 'V' shaped configuration formed around the inner cylindrical surface of the outer wall of the body, and an axially extending flexible rib or fin projecting radially outwardly from said inner peripheral skirt resiliently engageable in a respective one of said grooves.

5. An improved miniature watering device comprising a generally cylindrical body having a water inlet means, walls forming a central axial bore extending therethrough, said bore comprising lower small diameter bore portion communicating with said water inlet means which in turn is communicable with a source of pressurised water, and a relatively large diameter bore portion, the upper end of which is open,
a rotatable cap threadably engagable with said body and having a centrally located stem depending from its top wall, arranged to insertingly engage coaxially within said bore, said cap having at least one water outlet opening which communicates with the open upper end of said large diameter bore portion,
said stem terminating at its lower end in an annular valve seat engaging surface arranged to sealingly engage against a correspondingly shaped lower valve seating surface formed at the lower end of said small diameter bore portion, said stem having an upper sealing engagement surface intermediate its ends arranged to sealingly engage the wall of the small diameter bore portion at or adjacent its upper end, a reduced thickness section extending between said valve seat engaging surface and said engagement surface, and an axially extending channel forming groove approximately co-extensive with said reduced thickness section,
said channel forming groove, when the device is in operation, forming a first water flow pathway from said inlet means through the small diameter bore portion to said large diameter bore portion,
said reduced thickness section, during operation of the device, forming a second water flow pathway from said inlet means through the small diameter bore portion to the relatively large diameter bore portion, the arrangement being such that initial unscrewing of the cap causes water to flow only along the first water flow pathway for discharge from said opening in the cap in a drip form, whilst upon unfurther screwing of the cap, water is caused to flow along said second water flow pathway with a flow rate which progressively increases as the cap is unscrewed progressively further.

6. An improved miniature watering device according to claim 6 wherein said reduced thickness section is shaped and dimensioned such that, as the cap is rotated relative to the body to in turn raise or lower the stem within the bore, an arcuate orifice of variable circumferential width is formed between the stem and the upper circular edge of the small diameter bore portion, the adjustment in width of said orifice in turn adjusting the rate of water flow from the device.

* * * * *